UNITED STATES PATENT OFFICE.

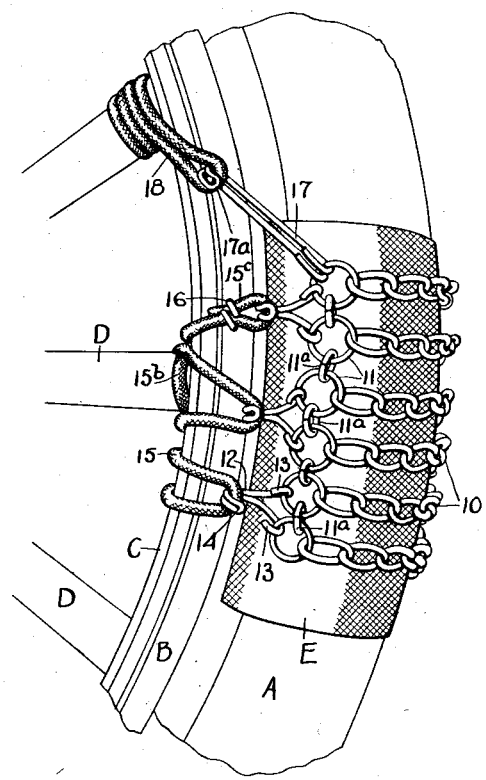
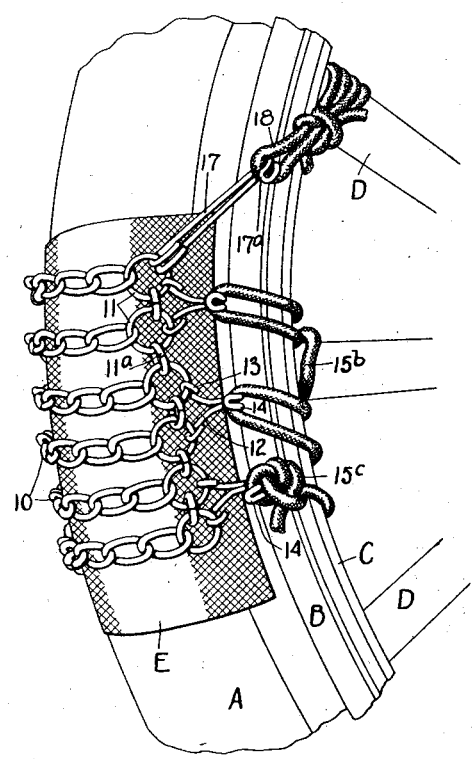
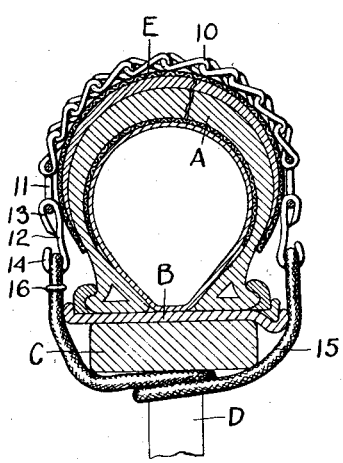
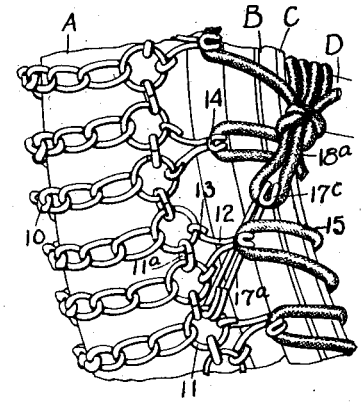

WILLIAM S. RAWLINGS, OF MARSHALL, INDIANA.

TIRE-PROTECTOR AND ANTISKID DEVICE.

1,130,539.  Specification of Letters Patent.  Patented Mar. 2, 1915.

Application filed November 17, 1914. Serial No. 872,531.

*To all whom it may concern:*

Be it known that I, WILLIAM S. RAWLINGS, a citizen of the United States, and a resident of Marshall, in the county of Parke and State of Indiana, have invented a new and Improved Tire-Protector and Antiskid Device, of which the following is a full, clear, and exact description.

My invention relates to devices for application to tires, and employing transverse chain elements, together with means to secure said elements in position.

An object of my invention is to provide a device of the character indicated which may be made in small sections, for use as a boot over an outside patch, or made to extend completely around a tire as an anti-skid device and tire protector.

In carrying out the invention, a series of transverse chains are employed, and interlock, in a novel manner hereinafter described, at each side of the attachment. Hook elements associated with the chains are adapted to be engaged by a lacing cord, the cord being passed from side to side, laced through the hooks alternately at opposite sides of the tire, and looped or bent around the spokes of the wheel whereby to hold the chains against transverse shifting on the tire. In addition to the lacing hooks the device is equipped with anchor hooks at the sides. To co-act with and engage the anchor hooks, an anchor cord is employed, to be secured to a spoke and to the anchor hooks, in order to resist a backward creeping of the chains on the tire.

The invention will be particularly described in the specific description following.

Reference is had to the accompanying drawings forming part of this specification, in which similar characters of reference indicate corresponding parts in all the views, and in which:

Figure 1 is a perspective view of my improved device showing the same applied to a portion of a wheel and tire; Fig. 2 is a similar view from the opposite side of the wheel; Fig. 3 is a transverse section; and Fig. 4 is a fragmentary side view showing a section of the tire protector of a form employed when arranged to extend completely around a tire.

The invention is more particularly applicable to a tire and wheel in which the wheel is provided with spokes, there being indicated beneath the tire A of known form engaged by a clencher rim B and appurtenances of a wheel C.

The spokes are indicated by the letter D, an outside patch being indicated by the letter E.

In carrying out my invention in practice, in accordance with the illustrated example, transverse chains 10 are provided, and at the sides of the attachment on the ends of the chains are rings 11. The rings of adjacent chains are united by transverse rings or coupling links 11$^a$.

Attached to the rings 11 and radially disposed when the attachment is in use, are hooks designated generally by the numeral 12. The shank of each hook presents diverging members terminating in eyes 13, which engage a pair of adjacent rings 11. Thus one hook engages two adjacent rings 11 and therefore two adjacent chains 10, The bill 14 of each hook is adapted to be engaged by a lacing cord 15, which is laced alternately through the hooks at opposite sides passing at the back of the rim C of the wheel. In the case of a boot as shown in Figs. 1 and 2, the lacing cord 15 wll have one terminal formed with an eye 15$^a$ by means of a clip 16 or equivalent means; said terminal being engaged with one end hook, and the cord in addition to being laced through the hooks at alternately opposite sides, is given a bend or loop 15$^b$ around a spoke D. The free end of the cord may be tied into a knot 15$^c$, or otherwise fastened.

The described lacing hooks and lacing cord serve to hold the protector and the patch firmly against shifting movement transversely of the tire. In order to positively hold the protector against creeping backward on the tire, I provide anchor hooks 17, two of said hooks being used in the form shown in Figs. 1 and 2, one hook at each side of the protector. The hooks 17 are engaged with end rings 11, and they are of greater length than the lacing hooks 14. The increased length of the hook as compared with the lacing hook serves for the proper and convenient employment of an anchor cord 14, which is doubled or otherwise given a loop form to engage the bill 17$^a$ of the anchor hooks. The anchor cord 18 is passed forwardly from the hook 17 and given one or more turns about a spoke D forward of the patch, the anchor hooks 17 being caused to take oblique position and their length serving to bring the bill 17$^a$ of the hooks to a proper point inward of the tread.

I have found in practice, in the case of a puncture or blow-out, that a patch secured and protected by the described device results in a greatly increased service.

In the form shown in Fig. 4 the attachment is adapted to extend in practice completely around a tire. In this form of the invention the chains 10, the rings 11, the coupling rings 11ᵃ and the lacing hooks 12 are identical with the form shown in the other figures. The anchor hook 17ᵇ, at each side of the tire is made longer than the lacing hooks in order that the bill 17ᶜ of each anchor hook will not interfere with the adjacent lacing hook when disposed obliquely by the anchor cord 18ᵃ. The added length of the hook disposes the bill 17ᶜ out of the zone of the bills 14 of the lacing hooks. The lacing cord 15ᵈ is engaged alternately with the hooks 12 at opposite sides, and is given a loop around certain of the spokes D of the wheel. The anchor hooks and anchor cord 18ᵃ may be positioned at any desired point around the wheel, the said anchor hooks being secured to any one of the rings 11 of the protector at opposite sides of the wheel.

Having thus described my invention, what I claim as new and desire to secure by Letters Patent, is:

1. A tire protector of the character described, comprising a series of transverse chains, a series of hooks connected with the chains at the sides of the attachment, said hooks of each series having the bills disposed in a zone at each side and adapted to receive a lacing cord to prevent transverse shifting of the chains, and anchor hooks on the attachment at the sides thereof adapted to receive an anchor cord, said anchor hooks being of greater length than the adjacent lacing hooks and having their bills disposed out of the zones of the said lacing hooks.

2. A tire attachment of the character described, comprising a series of connected transverse chains, a series of hooks connected with the chains at the sides of the attachment and adapted to receive a lacing cord, and anchor hooks on the attachment additional to the lacing hooks and of greater length than the said lacing hooks.

3. A tire attachment of the character described comprising a series of connected transverse chains adapted to extend across a tire, a series of lacing hooks connected with the chains and disposed in zones at the sides of the attachment, said hooks being adapted to receive a lacing cord, and anchor hooks on the attachment at the sides thereof, said anchor hooks having their bills disposed out of the zones of the lacing hooks.

4. An attachment of the character described, comprising a series of transverse chains, means at each side of the attachment connecting said chains, a series of hooks on the attachment at each side, said hooks extending radially inward from the chains and adapted to receive a lacing cord, and anchor hooks additional to the lacing hooks and adapted to receive an anchor cord, said anchor hooks being disposed obliquely.

5. The combination with a wheel having spokes, and a tire upon said wheel, of a series of transverse chains, means connecting the chains at the sides of the attachment, a series of lacing hooks secured to said connecting means, a cord laced alternately through the hooks at opposite sides of the chains and looped around the spokes, the ends of the cord being fastened, anchor hooks on the chains at the sides thereof additional to the lacing hooks, and an anchor cord engaging said anchor hooks and engaging a spoke of the wheel.

6. In a tire attachment of the character described, a series of transverse chains, rings on each chain at its ends, links connecting the adjacent rings of the chains, a series of lacing hooks at each side of the attachment, each hook having a bill radially inward from the chains and rings and having shanks formed of diverging members, said shanks being secured respectively to two adjacent rings, and anchor hooks additional to the lacing hooks, said anchor hooks being carried by certain of said rings.

In testimony whereof I have signed my name to this specification in the presence of two subscribing witnesses.

WILLIAM S. RAWLINGS.

Witnesses:
J. C. SWANN,
E. M. HOBSON.